Feb. 28, 1956  H. J. KIMMERLE  2,736,121
APPARATUS FOR HANDLING FISH OR THE LIKE
Filed Feb. 20, 1951  2 Sheets-Sheet 1
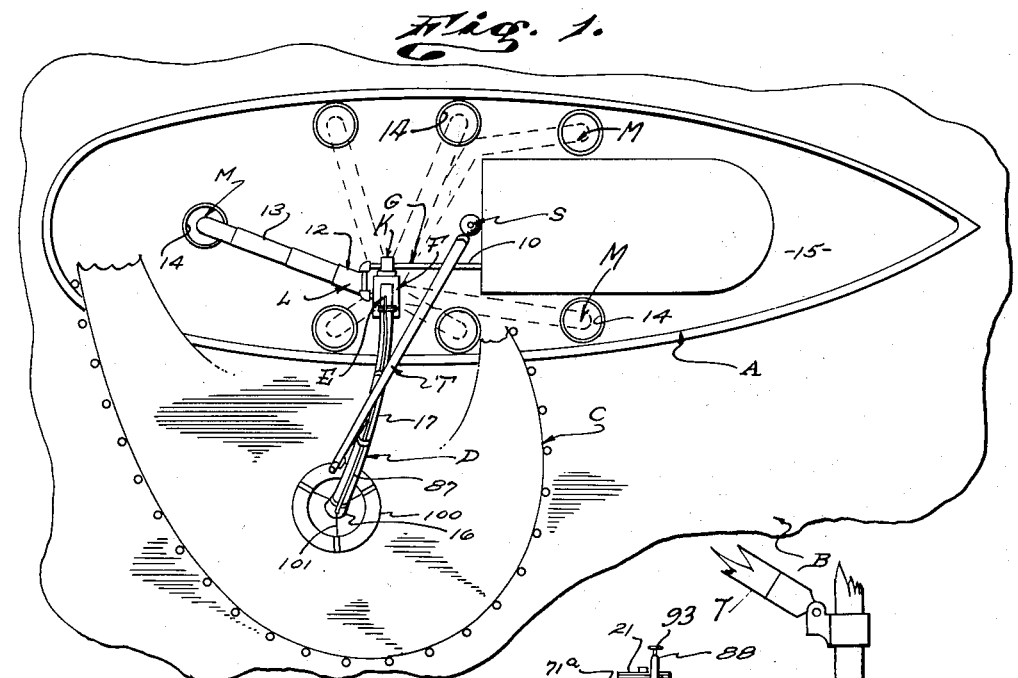
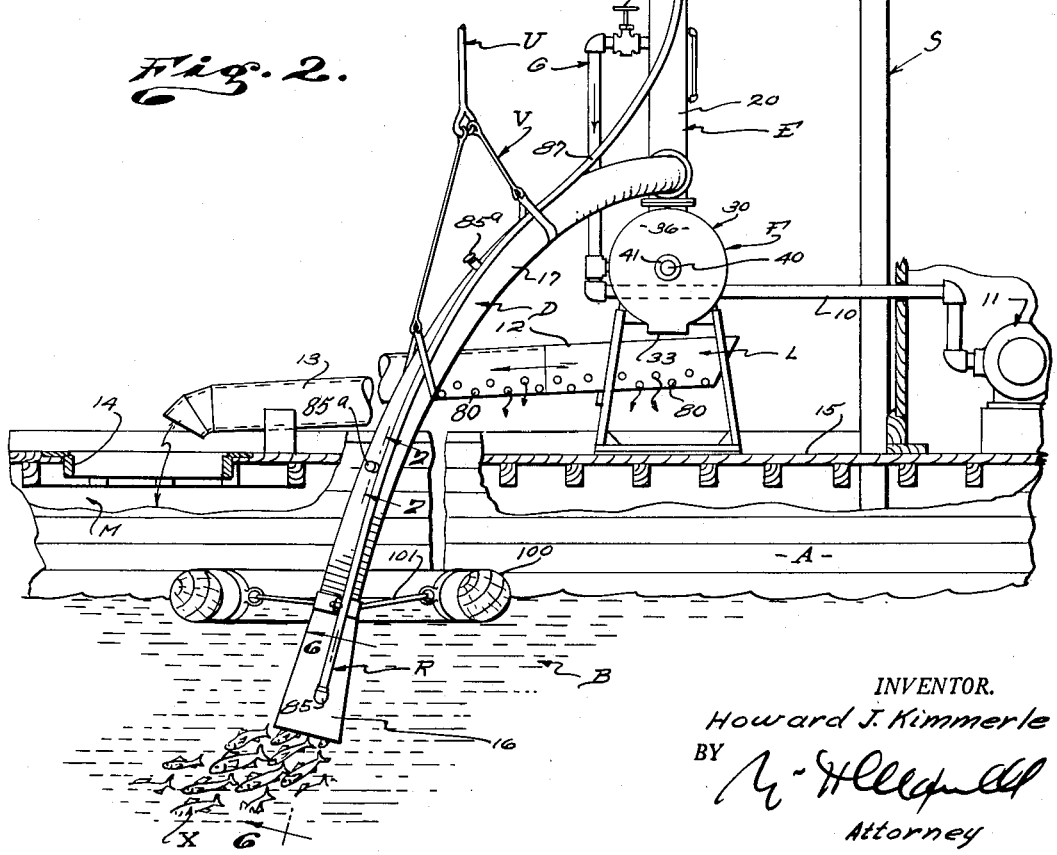
INVENTOR.
Howard J. Kimmerle
BY
Attorney

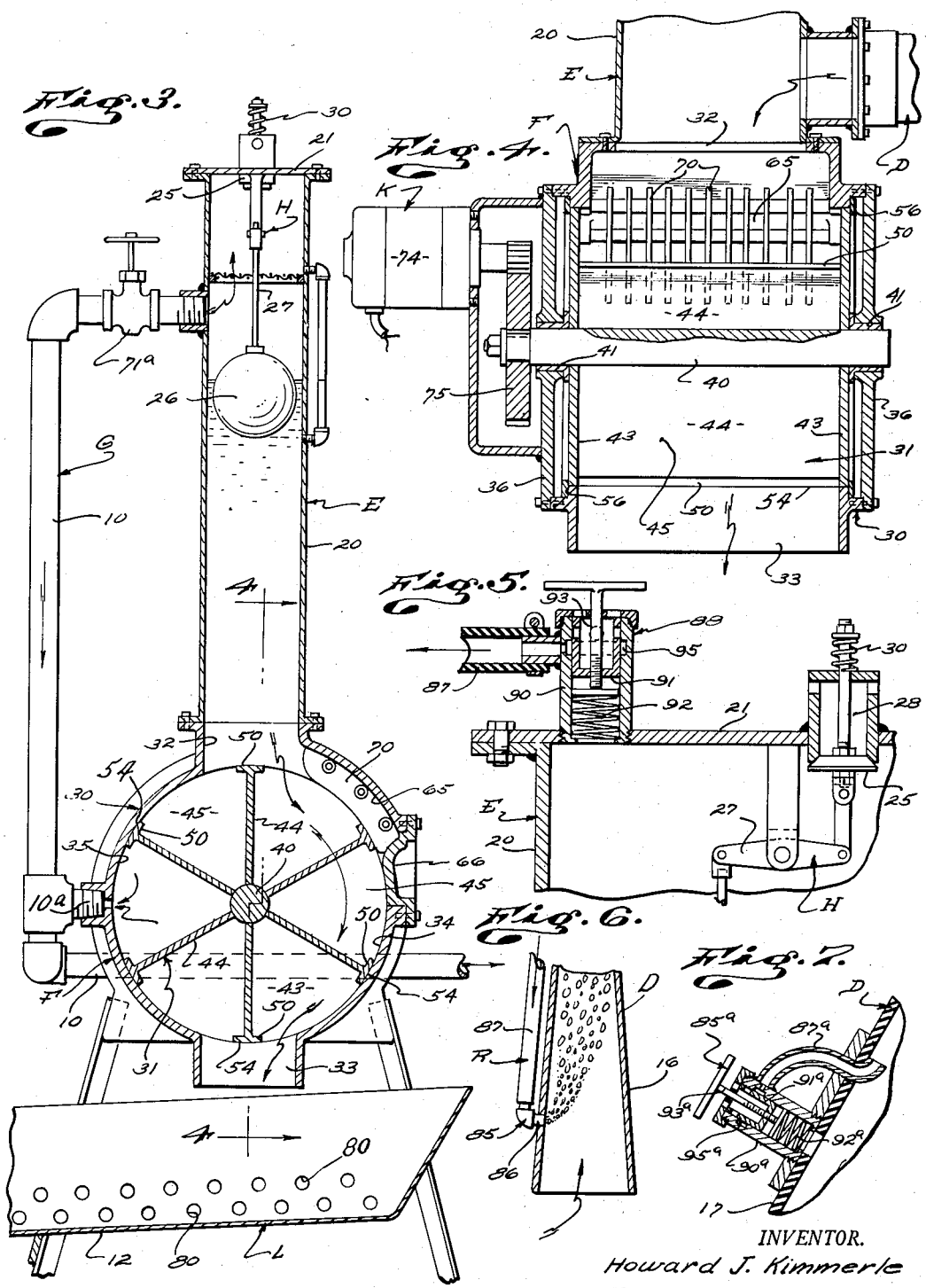

United States Patent Office 2,736,121
Patented Feb. 28, 1956

2,736,121

APPARATUS FOR HANDLING FISH OR THE LIKE

Howard J. Kimmerle, Los Angeles, Calif.

Application February 20, 1951, Serial No. 211,843

6 Claims. (Cl. 43—6.5)

This invention has to do with apparatus for the handling of fish, or the like, and it is a general object of the invention to provide for rapid efficient handling of fish without injury or mutilation.

This application is a continuation-in-part of application Serial No. 113,978, entitled "Material Handling Apparatus," filed September 3, 1949, now U. S. Patent No. 2,666,671 issued January 19, 1954.

The present invention in its broader aspects is useful for the handling of objects or articles such as fish and it may be used to advantage where it is desired to transfer fish, for example, elevate and convey them from one location to another. In a preferred use of the apparatus of the present invention it serves to transfer fish from a body of water to a receptacle or boat and in the course of such handling it elevates the fish a substantial distance and may deposit them in the boat to be later removed or handled by the apparatus when it is desired to unload the boat.

The present invention provides, generally, a carrier or vessel which may be a boat, and a flow line that may be supported on or from the boat and which has a receiving end to be submerged in a body of water carrying objects or articles such as fish. The body of water may be that in which the boat is floating, or it may be contained on or within the boat. The body of water may have a portion thereof defined or limited as by a net so that the fish to be handled are concentrated for efficient handling.

A tank receives flow from the said flow line and a means acts to establish and maintain a reduced pressure in the tank above the liquid occurring therein so that a pressure differential is maintained between the air above the liquid in the tank and that on the body of water in which the fish occur. Through the pressure differential thus established, water with fish therein flows in the line. A control is provided to govern the liquid level in the tank and a flow control is provided at the bottom of the tank to pass the fish out of the tank at a predetermined rate. The desired sub-atmospheric pressure is maintained in the top of the tank by an air pump, and the flow control at the bottom of the tank is in the nature of a rotary sealed dumping mechanism. The dumping mechanism may involve a horizontal cylindrical case having a top inlet opening receiving material from the tank and a bottom outlet opening is located below the inlet opening. A rotor operates in the case and has a circumferential series of buckets or pockets which carry fish and water or other material received from the tank down and around at one side of the case to flow out at the bottom of the case. The said side of the case is enlarged adjacent the inlet and is provided with flexible ribs or guards which cooperate with the rotor to prevent fish being caught between the rotor blades and the wall of the case. At the other or opposite side of the case, means is provided for exhausting air from the pockets as they move upwardly so that the pockets are substantially empty or free of air before they reach the inlet or top of the case. The means exhausting air from the pockets may be connected with the same pump which maintains a reduced pressure in the upper portion of the tank.

Flow inducing means is provided in connection with the flow line and involves one or more air inlet units suitably located along the flow line. Each inlet unit may involve a simple air inlet duct or nozzle supplying air at atmospheric pressure to the interior of the flow line. Where such air inlet units occur above the level of the body of water they may be open to atmosphere at or immediately adjacent the exterior of the flow line and they need only be air ducts under control of suitable valves. Where the air inlet units occur beneath the level of the body of water, air at atmospheric pressure is supplied by lines and may be supplied through valves acting in response to pressure occurring in the upper portion of the tank. The air so admitted forms bubbles and so lessens the weight of the column and permits a higher lift.

A drive constantly operates the rotor in one direction. A fish receiver receives the discharge from the flow control and separates the water and fish delivered by the flow control, and preferably serves to convey or conduct the fish to a remote point for purpose of storage or suitable handling. The receiver may be an inclined preforated chute with openings to allow water to rapidly drain through it and it is inclined so fish will slide or operate along it through the action of gravity. Where the carrier is a boat the chute may be adjustable so it can be arranged to discharge into various storage tanks or parts of the hold of the boat and, the receiver and flow pipe are such that to unload the boat the receiving end of the flow pipe can be arranged in the hold or tank of the boat and the receiver can be positioned to deliver fish to a suitable conveyor or receptacle.

It is a general object of the present invention to provide apparatus of the general character referred to that operates effectively to handle fish, either from a body of water for delivery into a boat or from the boat to a conveyor or other receptacle for suitable handling. The apparatus of the present invention applied to or operating in connection with a typical fish boat provides for efficient and practical removal of fish from the water in which they are found, to the boat, and then from the boat, without injury and without handling operations that are usually incidental to taking of fish.

A further object of the invention is to provide flow inducing means, operating in connection with the flow line through which the fish pass, with a stream of water, so that effective, rapid flow occurs even in situations where the lift involved is through a distance that would otherwise make flow caused by atmospheric pressure impossible or impractical. With the present invention the flow or stream provided to carry the fish is created and maintained by establishing an air pressure differential and the flow inducing means introduces air into the stream so that it materially reduces the weight of the column and aids in the maintenance of a desirable flow.

Another object of the invention is to provide control means in connection with the flow inducing means whereby air for the purpose of inducing flow is not admitted into the stream until flow has been started in the flow line.

Another object of the invention is to provide a simple, practical and economical means of handling fish to and from a carrier or boat, so that the fish is taken from the water, deposited in the boat and finally removed from the boat and delivered at a desired point, all without manual handling or the use of various scoops, implements, and paraphernalia such as is usually necessary for such operations.

The various objects and features of my invention will be fully understood from the following detailed description of a typical preferred form and application of the invention, throughout which description reference is made to the accompanying drawings, in which:

Fig. 1 is a plan view of a boat provided by the present invention showing a net operated in connection therewith to convey fish so that they are efficiently handled by the apparatus provided by the invention. Fig. 2 is an enlarged side elevation of a portion of the boat and illustrating the manner in which the apparatus of the present invention operates in transferring fish from a body of water to the boat. Fig. 3 is an enlarged detailed sectional view of apparatus employed in carrying out the invention. Fig. 4 is a vertical sectional view taken as indicated by line 4—4 on Fig. 3. Fig. 5 is an enlarged sectional view of the mechanism occurring at the upper end portion of Fig. 3. Fig. 6 is an enlarged view taken as indicated by line 6—6 on Fig. 2, and Fig. 7 is an enlarged view taken, generally, as indicated by line 7—7 on Fig. 2.

The apparatus which is the subject of this invention can be used to advantage in handling various articles or objects in situations where such articles or objects are subject to being floated or submerged in water. The invention is particularly practical in the handling of fish, and in the present disclosure it will be referred to in that connection.

The form of the invention that will be described will be applied to a carrier or vessel in the form of a boat and in the drawings I have shown a typical fish boat A operating in a body of water B in which the fish X to be handled are located. The apparatus provided by the invention can be used or operated generally in connection with the body B of water. However, it is preferred that it be operated in connection with a limited portion of such body of water, for instance, in a portion defined by a net C and when this is the case the net may be handled from or may be related to the boat A in a manner such as is indicated in Fig. 1 of the drawings.

The invention provides a flow line D extending from equipment supported on the boat A to a point where it has a receiving end submerged in the body of water B, preferably in the portion of that body defined by the net C. The flow line extends to a tank E which is preferably a closed, vertically disposed tank, provided at its lower end with a flow control F. A means G is provided to normally exhaust air from the upper end portion of tank E and from the buckets or pockets of the control F preliminary to their being filled from the tank E. In the drawings the means G is shown as including an air or exhaust line 10 extending from the tank and the flow control F to an air pump 11. Control means H is provided in or at the upper end portion of tank E to govern the level of liquid maintained in tank E. A drive means K is provided for operating the control F. A receiver L is located to receive the material or fish discharged by control F and has a perforated trough portion 12 that drains off the water received from the control F while a chute portion 13 carries away the fish for delivery at a desired point. In Fig. 2 of the drawings the chute 13 is shown positioned to deliver fish into the hold M of a boat A through a hatch opening 14. Flow inducing means are provided in connection with the flow line D and act to supply air to the flow line in such manner as to lighten the stream flowing therethrough.

The boat A as illustrated in the drawings is, in effect, a carrier that serves as a mounting or support for the various other elements of the structure, and it also serves as a receptacle for holding fish taken from the body of water B so they can be advantageously transported to a desired location as, for instance, to a dock, or the like, where they can be finally delivered to a conveyor, deposited in a container, or handled by other suitable equipment.

The particular boat illustrated in the drawings is of the general type commonly employed in fishing operations and is shown as having a deck 15 carrying the apparatus provided by the present invention, and a hold M into which the fish may be delivered by the receiver L for storage while being transported. It is to be understood that the hold M may be divided or partitioned to handle the fish in any suitable manner, and as indicated in Fig. 1 of the drawings the hold M may be provided with various hatch openings 14 so that various parts or portions thereof are readily accessible.

From consideration of Figs. 1 and 2 of the drawings, it will be apparent that the apparatus provided by the present invention can be mounted on or carried by the deck 15 of the boat so that it does not interfere with other necessary or desired equipment, and in a typical situation the principal working parts of the apparatus can be mounted in a fixed location on the deck of the boat, preferably adjacent one side thereof, from which location the flow line D, which is preferably flexible, can be extended to a suitable part of the body of water B while the receiver L can be extended or arranged to deliver fish to the desired hatch of the boat.

It will be apparent from the drawings that the flow line D, shown arranged in the body B of water while the receiver L is positioned to deliver fish into the hold of the boat, can be rearranged or reversed so that the flow line is positioned in the hold of the boat and the receiver L is positioned to deliver fish to another hold or to any suitable receptacle or apparatus provided for receiving or handling the fish. In the particular case illustrated the boat is shown provided with a mast S equipped with a boom T and a line U depends from the boom to handle the flow line D through a suitable sling or connection V.

From the foregoing description it will be apparent that the flow line D may, in practice, vary widely in form, construction and extent. In the case illustrated the line D is an elongate tubular element of such length that it may be extended from the equipment located on the boat A to a desired point in the body B of water at which point it may be equipped with a fish receiving guide 16. The main body portion 17 of the line D may be a suitable hose or flexible structure shaped and proportioned substantially as illustrated in the drawings.

The tank E may be a simple vertically disposed element rectangular in cross section having flat side walls 20 and closed at its upper end by a top 21. The flow line D is shown connecting into the tank E through one of the side walls 20 at or close to the lower end thereof.

The means G provided to establish and maintain a reduced pressure in the upper end of tank E and in the control F may, in practice, vary widely in form and construction. In the drawings I show a suitably driven air pump 11, the suction of which is connected to the upper end of tank E and also with the flow control F by means of line 10. A suitable control valve 71$^a$ is preferably provided in the line 10 and serves as a general control for flow of air to tank E.

It is to be understood that the pump 11 can be driven or operated by any suitable source of power, and that auxiliary equipment such as accumulators and surge chambers can be included in the construction as circumstances may require.

When flow of water and fish occurs through line D as will be hereinafter described, water accumulates in the tank E. The means H controls the level of liquid or water in the tank E and in the drawings means H is shown as involving a simple control valve 25 and a float 26 operatively coupled with the valve through suitable linkage 27. Valve 25 controls flow of air through a suitable port 28 in the top 21 of the tank. The arrangement of parts is such that when water rises in the tank E and operates float 26, the float moves up and opens the valve 25 admitting air under atmospheric pressure into the tank through the port 28 causing increase in pressure on the air in the upper portion of the tank and consequent lowering of the liquid level in the tank. A spring 30 is shown normally yieldingly holding the valve 25 closed so that atmospheric pressure is admitted to the tank only when the float is moved upwardly.

The flow control F controls the discharge of fish and water from the bottom of tank E. The particular control illustrated involves a rotary tank or dumping mechanism and has a horizontally disposed cylindrical case 30 and a rotor 31 operating in the case.

The case 30 has a cylindrical body which is horizontally disposed and which has an inlet opening or port 32 at its uppermost side. A side wall 34 of the case extends from the inlet port 32 to an outlet port 33 at the bottom of the case and a side wall 35 extends from the outlet 33 to the inlet 32 and is opposite the wall 34. The case is closed at its ends by end plates 36.

The rotor 31 operated in the case just described has a central hub 40, the ends of which extend to be rotatably supported by bearings 41 carried by the end plates 36 of the case. The rotor has end plates 43 which are flat and radially disposed, and it has radially disposed partitions 44 that extend from the hub and between the ends 43 that divide the rotor into a plurality of buckets or pockets 45. The pockets form a series that extend circumferentially of the rotor and they open outwardly as clearly shown in Fig. 3 of the drawings.

The inlet 32 and outlet 33 of case 30 and the pockets 45 of rotor 31 are so related that at any particular time there is at least one pocket in position to receive material from tank E while another pocket is positioned to discharge by gravity through outlet 33 and one or more pockets are at the side wall 35 to be closed thereby.

Sealing means are provided between the various parts of the rotor and case to prevent leakage of air between the working elements just described. In the case illustrated shoes 50 of substantial circumferential extent are provided at the outer edges of the partitions to operate along or against the walls of the case. The outer faces 54 of the shoes fit the wall of the case with clearance. Suitable annular seals 56 are provided at the ends of the rotor.

In the control illustrated the wall 34 of case 30 is enlarged adjacent inlet 32 and the enlargement extends around in the case in the direction that the rotor travels or as indicated by the arrows in Fig. 3 of the drawings. The enlargement establishes a recess 65 in the case, which recess terminates in a wall 66 that is substantially tangential to the periphery of the rotor. The wall is shown as formed by a separable part that provides access to the interior of the structure. Flexible ribs 70, of rubber or the like, occur in the recess 65 and preferably extend circumferentially of the structure. The ribs 70 are spaced apart axially of the structure and cooperate with the rotor so that objects such as fish that tend to catch or jam are directed or guided into spaces between the ribs to extend circumferentially of the case and from that position fall into pockets as the pockets proceed around within the case. This action results in passage of objects such as fish from the inlet to the outlet without injury to the objects and without jarring the machine.

The exhaust means G operates to exhaust the pockets 45 of the rotor as they move upwardly from outlet 33 to inlet 32. As the pockets start up they are empty of water and fish and are filled with air at atmospheric pressure. Means G includes a part or branch 10ª of exhaust line 10 which is connected into the wall 35 of the case at the side where the pockets are moving upwardly and through this connection and air is exhausted from the pockets as they move up.

The drive K provided for operating the rotor 31 of the flow control may be any suitable prime mover such as a motor 74 at the exterior of the control operating the rotor of the flow control through a suitable drive connection 75. See Fig. 4.

The receiver L illustrated in the drawings has its perforated trough 12 located with a portion beneath the outlet of control F and the trough is provided with drainage openings or perforations 80 so the water is separated from the fish as the mixture of water and fish is discharged from the control F. The chute 13 of the receiver is an elongate structure and may in practice be made up of a plurality of sections telescopically related and the sections may be either rigid or flexible as circumstances require. By making the chute of the telescopic construction it can be varied as to length to accommodate various hatch openings of the boat A, and by making it with one or more flexible elements it can be positioned to avoid obstacles when encountered.

In practice the receiver L may vary widely in form and construction, in fact, it may be a mechanically operated conveying device. In most cases, however, and where fish are being handled, it is convenient to simply employ a structure without obstructions, in which case by supporting it at a suitable angle, on suitable supports as shown in the drawings, the fish will slide or flow by gravity.

The flow inducing means R are provided in connection with the flow line D, and in accordance with the invention such means may involve one or more air inlet units as circumstances require. In the case illustrated, an air inlet unit 85 is shown beneath the level of the body of water B and a plurality of air inlet units 85ª are shown above the level of the water B.

The air inlet unit 85, shown in detail in Fig. 6, may involve a simple air pipe 86 entering the flow line through the wall thereof. Where the air inlet unit is located below the level of the body of water B, an air supply line 87 is provided to conduct air to the inlet pipe 86. In the preferred form of the invention the air supply line 87 is provided with a suitable control means 88 so that air is admitted to the flow line only after flow has been started therein.

In the form of the invention illustrated the control 88 involves a normally closed valve that controls the admission of air under atmospheric pressure into the supply line 87. The valve is shown as having a body 90 which is cylindrical in form and which carries a slide or piston 91. The piston is an upwardly opening cup-shaped element while the cylindrical body 90 is carried by the top of the tank E and its lower end is in communication therewith. The piston and cylindrical body have ports 95 which are out of register when the piston is up. A suitable spring 92 under adjustment of a screw 93 normally holds the valve up.

When the air pressure in the upper end portion of the tank is reduced, atmospheric pressure acting on the piston 91 from its upper end moves it downwardly in the cylindrical body until the ports 95 in the body and piston register admitting air to the line 87. By the time pressure has lowered in the upper end of tank E so that the control valve opens, a sufficient differential pressure occurs between the ends of the flow line D so that flow has started in the flow line. The flow thus started in the flow line is promoted or induced by the induction of air to the flow line through the structure just described. It will be understood how air introduced into the flow line at a suitable point above its lower end mixes with the water in the flow line, and in trying to escape, flows upwardly or in the direction of the flow that occurs in the line to the end that the mass of the material in the flow line is lightened and induced to flow in the desired manner. Through the construction and action just described, I am able to lift fish a vertical distance greater than is possible by merely depending upon pressure differential between air in the upper portion of tank E and that acting on the surface of the body of water B. Further, in the case of fish, or the like, injury may be caused by excessive reduction in pressure. This danger is eliminated when air is admitted as I have just described.

The units 85ª of the means R may be simple air inlet valves suitably located along the flow line above the body of water B. In Fig. 2 of the drawings, I have shown two units 85ª and one of these is illustrated in detail in Fig. 7 of the drawings. The air inlet unit 85ª shown in Fig. 7 has a cylindrical body 90ª in communication with the interior of the flow line D. A cup-shaped piston or valve member 91ª operates in the cylindrical body and has its outer end open to atmospheric pressure. Ports 95ª in the body and piston are normally out of register so that the valve is closed and a spring 92ª under control of a screw 93ª normally holds the piston out so the ports are out of register. In the particular case shown, an air line 87ª extends from the valve body 90ª to the interior of the flow line and receives air when the ports 95ª are in register.

With the construction just described, when a suitable pressure differential exists between the inside and outside of the flow line, the valve member 91ª operates causing the ports 95ª to register. This operation admits air to the flow line and the air thus admitted induces flow of material in the flow line.

When the present invention is employed as shown in Figs. 1 and 2, the outer or receiving end portion of the flow line is preferably held so that its receiving end is a suitable distance below the surface of the body of water. In the case illustrated, an annular float 100 is provided around the receiving end portion of the flow line, the flow line being held within the float by means of suitable ties 101.

In operating the apparatus provided by the present invention, a catch of fish can be accumulated in the net C and brought into suitable position relative to the boat A, for instance, to a point adjacent the boat as shown in Fig. 1. The apparatus above described is then put into operation with the flow line D having its receiving end submerged in the body of water B within the confines of the net C. As the apparatus operates, water and fish flow up through the line D and through the control F for delivery into the receiver L. The receiver separates the water and fish and delivers the fish at the desired point, for instance, into the hold of the boat. When the catch has been taken or when the desired load has been caught and thus deposited in the boat, the boat is operated to a desired point, as for instance, to a point adjacent a dock or unloading station and where the flow line D is inserted through a hatch opening and into the hold of a boat and the apparatus put into operation so that water and fish from the hold of the boat flow up through the flow line to discharge through the control F. From the control F the receiver L separates the water and fish and may be positioned to deliver the fish to any desired point, as for instance, to a conveyor or other equipment provided for handling the fish in the desired manner.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. Apparatus for handling fish in water that is exposed to atmospheric pressure including, a tank above the water, a control at the lower end of the tank adapted to pass water and fish from the tank, means exhausting air from the upper end portion of the tank to maintain a subatmospheric pressure in the top of the tank, an unrestricted flow line handling water and fish and having an open receiving end submerged in a fish carrying body of water and an outlet end open and communicating with the tank, the line being adapted to have water with fish therein flow therethrough due to the difference in pressures at the ends of the line, and flow inducing means in connection with the flow line aiding the said flow of water and fish due to pressure differential between the ends of the flow line.

2. Apparatus for handling fish in water including, a tank above the water, a control at the lower end of the tank adapted to pass water and fish from the tank, means exhausting air from the upper end portion of the tank to maintain a subatmospheric pressure in the top of the tank, a flow line handling water and fish and having a receiving end submerged in a fish carrying body of water and an outlet end communicating with the tank, and air inlet means in connection with the flow line aiding flow of water and fish due to pressure differential between the ends of the flow line.

3. Apparatus for handling fish in water including, a tank above the water, a control at the lower end of the tank adapted to pass water and fish from the tank, means exhausting air from the upper end portion of the tank to maintain a subatmospheric pressure in the top of the tank, a flow line handling water and fish and having a receiving end adapted to be submerged in a fish carrying body of water and an outlet end communicating with the tank, and flow inducing means in connection with the flow line aiding flow of water and fish due to pressure differential between the ends of the flow line, the flow inducing means including, an air inlet passing air into the flow line intermediate its ends, an air suply line supplying air to the air inlet, and a normally closed valve controlling flow through the air supply line and opened by reduction of air pressure in the tank.

4. Apparatus of the character described including, a tank, a flow line extending to the tank, means establishing a flow of object bearing liquid into the tank, and a flow control through which liquid and objects therein are discharged from the tank including a cylindrical case with circumferentially spaced inlet and outlet openings in its peripheral wall, a rotor operating in the case, the peripheral wall of the case being recessed from the inlet opening in the direction of operation of the rotor, and a plurality of flexible, circumferentially disposed, axially spaced ribs in the recess of the case affording means to pass objects from said inlet opening to said outlet opening without injury to said objects.

5. Apparatus of the character described including, a tank, a flow line extending to the tank, means establishing flow of object bearing liquid into the tank, and a flow control through which liquid and objects therein are discharged from the tank including a cylindrical case with circumferentially spaced inlet and outlet openings in its peripheral wall, a rotor operating in the case and having outwardly opening object receiving pockets, the peripheral wall of the case being recessed from the inlet opening in the direction of operation of the rotor, means adapted to exhaust air from the pockets as they move from the outlet opening to the inlet opening, and a plurality of flexible, circumferentially disposed, axially spaced ribs in the recess of the case affording means to pass objects from said inlet opening to said outlet opening without injury to said objects.

6. Apparatus of the character described including, a suction flow line open and unrestricted from one end to the other and having an inlet end adapted to be submerged in a body of water under atmospheric pressure and bearing objects to be moved and an outlet end open and above the body of water, pump means at the outlet end of the line adapted to maintain a subatmospheric pressure thereon so water flows up through the line, and flow inducing means including an air inlet adapted to introduce air into the line intermediate its ends and an air supply line extending to the air inlet and adapted to supply the air inlet with air at pressure greater than that at the outlet end of the flow line, and a valve adapted to control flow of air through the air supply line, the valve being normally closed and being responsive to pressure at the outlet end of the flow line to open when the pressure at the outlet end of the flow line is a predetermined amount below atmospheric pressure.

(References on following page)

References Cited in the file of this patent

UNITED STATES PATENTS

| | | | |
|---|---|---|---|
| 941,024 | Mantius | Nov. 23, | 1909 |
| 1,316,507 | Pollard | Sept. 16, | 1919 |
| 1,321,262 | Townsend | Nov. 11, | 1919 |
| 1,361,691 | Davis | Dec. 7, | 1920 |
| 1,385,870 | Gieseler | July 26, | 1921 |
| 1,388,414 | Dros | Aug. 23, | 1921 |
| 1,447,553 | Hudson | Mar. 6, | 1923 |
| 1,466,413 | Schaanning | Aug. 28, | 1923 |
| 1,745,251 | Ernight | June 28, | 1930 |
| 2,163,282 | Hovden | June 20, | 1939 |
| 2,293,871 | Whitfield | Aug. 25, | 1942 |
| 2,396,305 | Toft | Mar. 12, | 1946 |
| 2,433,408 | Tollefsen | Dec. 30, | 1947 |
| 2,516,388 | Humphreys | July 25, | 1950 |
| 2,522,077 | Wahl | Sept. 12, | 1950 |

FOREIGN PATENTS

| | | | |
|---|---|---|---|
| 39,290 | Denmark | Mar. 16, | 1927 |